(12) United States Patent
Oota et al.

(10) Patent No.: US 11,765,299 B2
(45) Date of Patent: Sep. 19, 2023

(54) INFORMATION PROCESSING APPARATUS AND METHOD

(71) Applicant: CANON KABUSHIKI KAISHA, Tokyo (JP)

(72) Inventors: Makoto Oota, Tokyo (JP); Shuichi Ohkawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 321 days.

(21) Appl. No.: 17/163,929

(22) Filed: Feb. 1, 2021

(65) Prior Publication Data

US 2021/0243404 A1 Aug. 5, 2021

(30) Foreign Application Priority Data

Feb. 4, 2020 (JP) ................................. 2020-017235

(51) Int. Cl.
*H04N 1/32* (2006.01)
*H04N 5/77* (2006.01)
*G06T 7/44* (2017.01)

(52) U.S. Cl.
CPC ........... *H04N 1/32128* (2013.01); *G06T 7/44* (2017.01); *H04N 5/772* (2013.01)

(58) Field of Classification Search
CPC .... H04N 5/772; H04N 1/32128; H04N 5/765; G06T 7/44; G06T 11/60; G06V 10/44
See application file for complete search history.

(56) References Cited

U.S. PATENT DOCUMENTS

| 8,483,509 | B2 | 7/2013 | Matsuzaka | |
|---|---|---|---|---|
| 2005/0253877 | A1* | 11/2005 | Thompson | G09G 3/3611 345/698 |
| 2007/0104476 | A1* | 5/2007 | Yasutomi | H04N 23/632 348/E5.042 |
| 2007/0109411 | A1* | 5/2007 | Jung | H04N 1/00132 386/E5.067 |
| 2007/0242879 | A1 | 10/2007 | Suzuki | |
| 2008/0050111 | A1* | 2/2008 | Lee | G03B 19/00 396/429 |
| 2008/0122949 | A1* | 5/2008 | Kindborg | H04N 7/181 348/E7.086 |
| 2011/0032373 | A1* | 2/2011 | Forutanpour | G11B 27/34 348/222.1 |
| 2011/0314049 | A1* | 12/2011 | Poirier | G06F 16/58 382/218 |
| 2013/0182138 | A1* | 7/2013 | Cho | H04N 1/00411 348/211.3 |

(Continued)

FOREIGN PATENT DOCUMENTS

JP 2005251166 A 9/2005
JP 2007288555 A 11/2007

*Primary Examiner* — Abdelaaziz Tissire
(74) *Attorney, Agent, or Firm* — ROSSI, KIMMS & McDOWELL LLP

(57) ABSTRACT

An information processing method comprises: transmitting first image data to an external image processing apparatus and receiving second image data processed by the external image processing apparatus; extracting a feature amount according to a content of image processing performed by the external image processing apparatus from the first image data; and converting the extracted feature amount to displayable information and displaying the information on a display.

10 Claims, 8 Drawing Sheets

(56) References Cited

U.S. PATENT DOCUMENTS

2013/0307999 A1* 11/2013 Motta ................ G06F 3/005
                                                               348/207.1
2016/0292836 A1* 10/2016 Perry ................. G06T 5/007
2017/0359524 A1* 12/2017 Hosono ............. H04N 23/683

* cited by examiner

FIG. 5

| RAW IMAGE ID | RAW DEVELOPED RESULT ID | PROCESSED DATE/TIME | ABERRATION/ SENSOR CORRECTION Ver. | BLACK LEVEL ADJUSTMENT ver. | WB ADJUSTMENT ver. | NOISE REDUCTION ver. | PIXEL INTERPOLATION ver. |
|---|---|---|---|---|---|---|---|
| 00001234 | 00001024 | 2020/11/22 11:22:33.444 | 4.12.20.300 | 6.70.80.001 | 5.08.09.123 | 3.14.56.200 | 2.34.56.789 |
| 00001235 | | | | | | | |

INFORMATION PROCESSING APPARATUS AND METHOD

BACKGROUND OF THE INVENTION

Field of the Invention

The present invention relates to an information processing apparatus and method, and more particularly to an information processing apparatus and method in a system that performs image processing using an external image processing apparatus.

Description of the Related Art

Conventionally, an image capturing apparatus such as a digital camera or a smartphone compresses data input from an image sensor such as a CCD or a CMOS sensor based on an image format such as JPEG or TIFF, and records it as image data on a storage medium such as a memory card. Since the above-mentioned compression process generally adopts lossy coding, the user cannot significantly readjust the image data later.

However, in recent years, in some image capturing apparatuses such as smartphones and digital cameras, it has become possible to digitize an electric signal read out from an image sensor as it is and record it as image data. Hereinafter, the image data recorded in this way will be referred to as "RAW image data". By developing the RAW image data on a PC or the like, the user can finish the image closer to the user's intention than developing it on the image capturing apparatus. Japanese Patent Laid-Open No. 2005-251166 discloses a method for developing RAW image data.

Further, Japanese Patent Laid-Open No. 2007-288555 discloses a technique for visualizing the effect of image processing as described above, and if contents of the image processing are fixed, it is possible to extract information indicating a feature amount of image data and generate a display image by combining the extracted information and the image data.

Further, in recent years, by using a so-called cloud service, a user can develop RAW image data in a relatively short time using a server in the cloud (hereinafter, referred to as a "cloud server").

On the other hand, there is a demand that a user wants to transmit image data to the cloud server after confirming in advance the effect of image processing to be executed on the cloud server (hereinafter referred to as "cloud image processing") within a predictable range. For example, such a demand occurs when the cloud image processing service is a pay-per-use service or when there is a limit on the number for processing images.

However, in cloud image processing, it is conceivable that the processing contents may be changed after the operation of the cloud service is started, or the user may select and execute an execution function among a plurality of image processing candidates including development processing when executing cloud image processing. As described above, since the image processing contents are not fixed, the technique described in Japanese Patent Laid-Open No. 2007-288555 cannot be applied.

SUMMARY OF THE INVENTION

The present invention has been made in consideration of the above situation, and enables a user to confirm the effect of cloud image processing within a predictable range before the cloud image processing is actually performed.

According to the present invention, provided is an information processing method comprising: transmitting first image data to an external image processing apparatus and receiving second image data processed by the external image processing apparatus; extracting a feature amount according to a content of image processing performed by the external image processing apparatus from the first image data; and converting the extracted feature amount to displayable information and displaying the information on a display.

Further, according to the present invention, provided is an information processing apparatus comprising: an external interface that transmits first image data to an external image processing apparatus and receives second image data processed by the external image processing apparatus; a control circuit that extracts a feature amount according to a content of image processing performed by the external image processing apparatus from the first image data, converts the extracted feature amount to displayable information, and displays the information on a display.

Furthermore, according to the present invention, provided is a non-transitory computer-readable storage medium, the storage medium storing a program that is executable by the computer, wherein the program includes program code for performing the causing the computer to function as an information processing apparatus, comprising: an external interface that transmits first image data to an external image processing apparatus and receives second image data processed by the external image processing apparatus; a control circuit that extracts a feature amount according to a content of image processing performed by the external image processing apparatus from the first image data, converts the extracted feature amount to displayable information, and displays the information on a display.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 5 is a diagram showing an example of data management information according to the embodiment;

DESCRIPTION OF THE EMBODIMENTS

Figure 1:
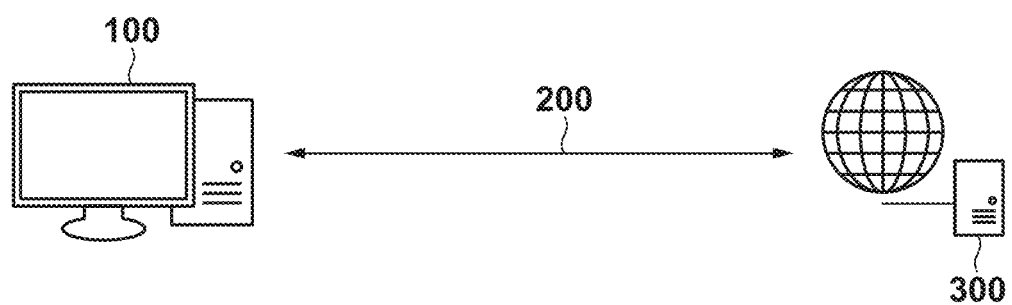
FIG. 1 is a diagram showing an example of a system configuration of an image information processing system according to an embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

<System Configuration>

FIG. 1 is a diagram showing an example of the system configuration of an image information processing system according to the present embodiment. A personal computer (PC) 100 communicates data with a server 300 (external image processing apparatus) via a public network 200. The configuration of each apparatus will be described later. In this data communication, in particular, image data, such as still image data and moving image data, captured by a digital camera or the like is transmitted and received. For example, the PC 100 transmits image data to the server 300 via the public network 200, and the server 300 develops the image data received from the PC 100. Then, the server 300 returns the developed image data to the PC 100 via the public network 200. In this way, the PC 100 can develop the image data by using the server 300.

<Configuration of the PC 100>

Figure 2:
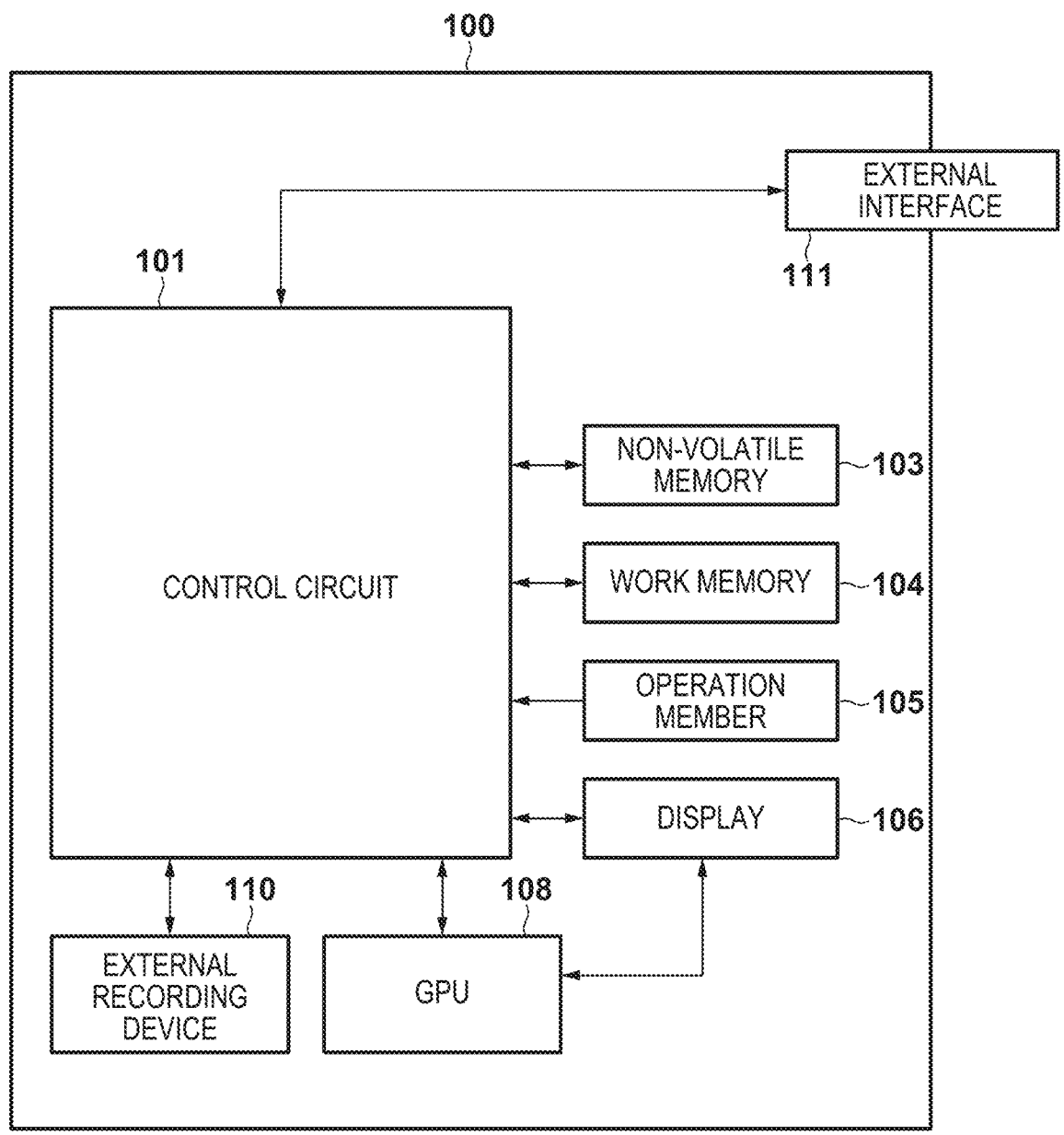
FIG. 2 is a block diagram showing an example of a configuration of a personal computer (PC) according to the embodiment.

FIG. 2 is a block diagram showing an example of the configuration of the PC 100 in the present embodiment. In the present embodiment, a stationary apparatus such as a personal computer will be described as an example, but the present invention is not limited to this, and any terminal capable of communicating with the server 300, for example, a notebook PC, a tablet, a smartphone or the like, may be used.

A control circuit 101 controls each unit of the PC 100 according to input signals and programs described later. Instead of the control circuit 101 controlling the entirety of the PC 100, a plurality of hardware may share the processing to control the entirety of the PC 100.

A non-volatile memory 103 is an electrically erasable and recordable non-volatile memory such as an HDD or SSD. The non-volatile memory 103 records an operating system (OS), which is basic software executed by the control circuit 101, and application programs that realize application functions in cooperation with the OS. Further, the non-volatile memory 103 stores application programs capable of performing image processing on image data such as RAW image data (hereinafter, referred to as an "image processing application"). The RAW image data will be described later.

A work memory 104 is a volatile memory and is used as a work area of the control circuit 101, a data save area at the time of error processing, and so forth.

An operation member 105 is used to receive an instruction to the PC 100 from the user, and includes, for example, a power button for the user to instruct the power on/off of the PC 100, input devices such as a keyboard and a mouse. The operation member 105 also includes a touch panel formed on a display 106 which will be described later. The operation member 105 does not necessarily have to be built in the PC 100, and the PC 100 can be connected to the internal or external operation member 105.

The display 106 is, for example, a liquid crystal display, an organic EL display, or the like, and displays characters or images for interactive operation. In addition, a Graphical User Interface (GUI) of the image processing application is also displayed on the display 106. The display 106 does not necessarily have to be built in the PC 100, and the PC 100 may be connected to the internal or external display 106 and may at least have a function of controlling displayed contents on the display 106.

A Graphics Processing Unit (GPU) 108 is an image processing circuit specialized in image processing. By using the GPU 108, the control circuit 101 can display image data on the display 106 and execute image processing such as development processing on the image data.

An external recording device 110 is a device that performs reading and writing from/to an external recording medium (not shown) that can be attached to and detached from the PC 100. When programs and image data are recorded on an external recording medium, they are read into the work memory 104 via the external recording device 110. The external recording medium is a non-volatile memory that can be attached to and detached from the PC 100, represented by, for example, an optical disk such as DVD-RW, CD-ROM, CD-R, DVD-RAM, a flexible disk, a magnetic disk such as MO, a magneto-optical disk, and a flash memory.

The PC 100 can send and receive data to and from the external apparatus via an external interface 111. For example, the PC 100 can be connected to an image capturing apparatus such as a digital camera via the external interface 111 to transmit and receive data. The communication by the external interface 111 may be either wired communication or wireless communication.

<Configuration of the Server 300>

Figure 3:
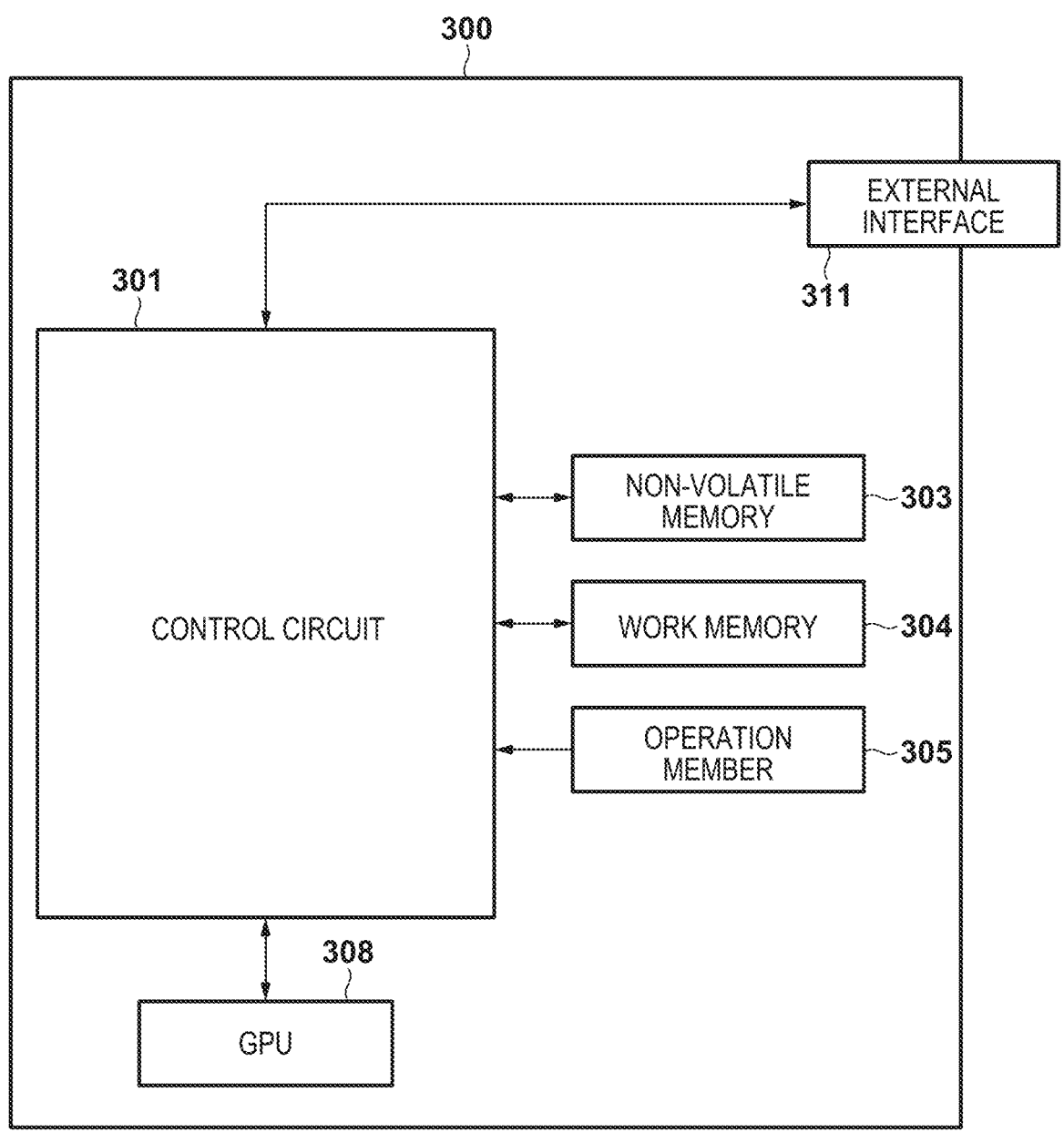
FIG. 3 is a block diagram showing an example of a configuration of a server according to the embodiment.

FIG. 3 is a block diagram showing an example of the configuration of the server 300 in this embodiment.

A control circuit 301 controls each unit of the server 300 according to input signals and programs described later. Instead of the control circuit 301 controlling the entirety of the server 300, a plurality of hardware may share the processing to control the entirety of the server 300.

A non-volatile memory 303 is an electrically erasable and recordable non-volatile memory such as an HDD, SSD, ROM, flash memory, optical disk, and the like. The non-volatile memory 303 records an operating system (OS), which is basic software executed by the control circuit 301, and application programs that realize application functions in cooperation with the OS. Further, the non-volatile memory 303 stores image processing application programs.

A work memory 304 is a volatile memory and is used as a work area of the control circuit 301, a data save area at the time of error processing, and so forth.

An operation member 305 is used to receive an instruction to the server 300 from the user, and includes, for example, a power button for the user to instruct the power on/off of the server 300, input devices such as a keyboard and a mouse. The operation member 305 does not necessarily have to be built in the server 300, and the server 300 can be connected to the internal or external operation member 305.

A GPU 308 is an image processing circuit specialized in image processing. By using the GPU 308, the control circuit 301 can display image data on a display (not shown) and execute arithmetic processing.

The server 300 can send and receive data to and from the external apparatus via an external interface 311. For example, the server 300 can be connected to an image capturing apparatus such as a digital camera and an external computer via the external interface 311 to transmit and receive data. The communication by the external interface 311 may be either wired communication or wireless communication.

<Configuration of System Software>

Figure 4:
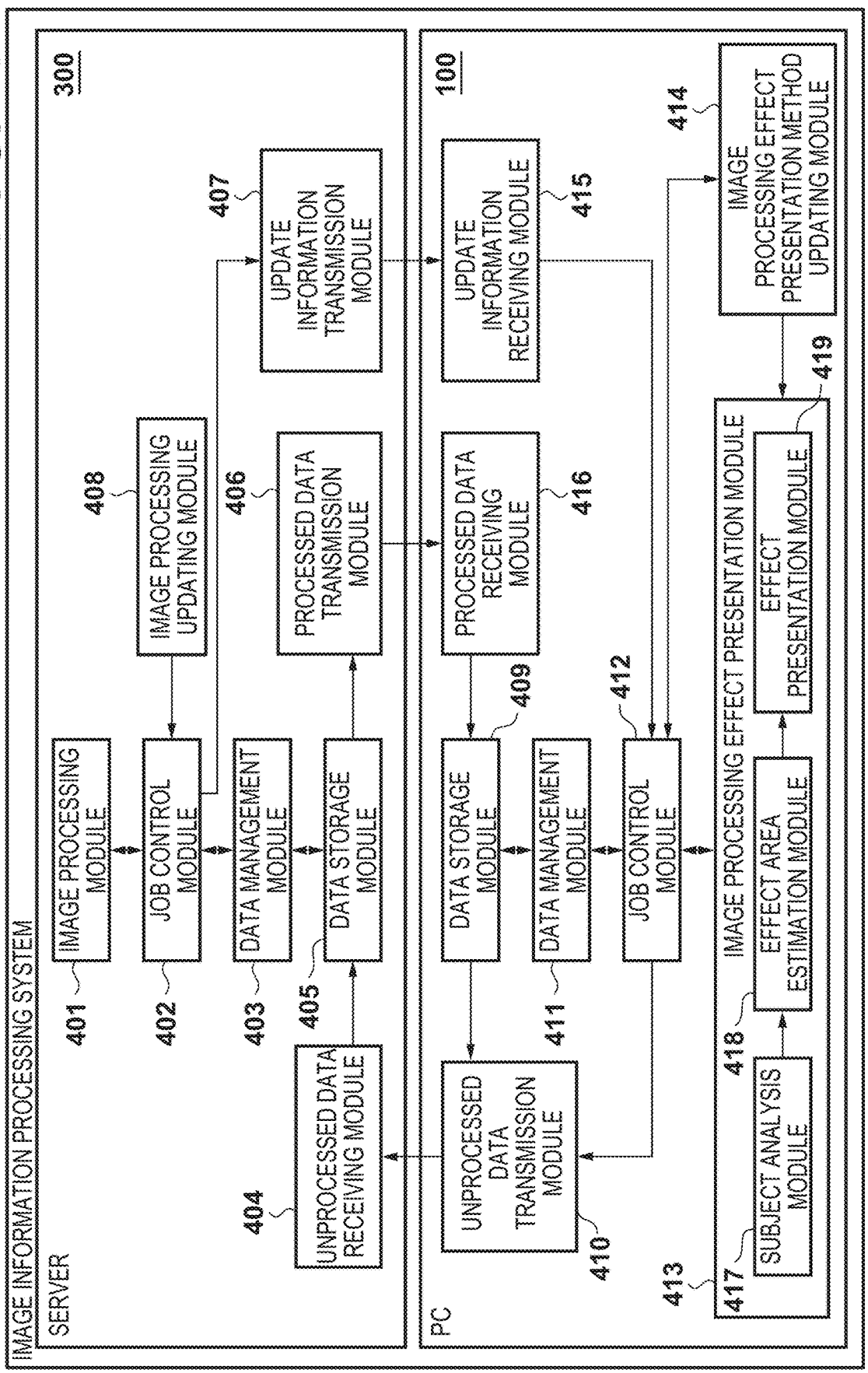
FIG. 4 is a block diagram showing an example of a software configuration of the image information processing system according to the embodiment.

FIG. 4 is a diagram showing an example of the software configuration of the image information processing system in the present embodiment. The image information processing system consists of one or more of the PCs 100 (client terminal) and one or more of the servers 300 (cloud terminal). In particular, since the server 300 is a cloud server, the functions may be distributed to a plurality of physical servers and virtual servers to provide a cloud image processing function.

The server 300 includes an image processing module 401, a job control module 402, a data management module 403, an unprocessed data receiving module 404, a data storage module 405, a processed data transmission module 406, an update information transmission module 407, and an image processing updating module 408. Each of the modules 401 to 408 constituting the server 300 is realized by loading the program recorded in the non-volatile memory 303 to the work memory 304 and executing the loaded program by the control circuit 301.

The PC 100 includes a data storage module 409, an unprocessed data transmission module 410, a data management module 411, a job control module 412, an image processing effect presentation module 413, an image processing effect presentation method updating module 414, an update information receiving module 415, and a processed data receiving module 416. Each of the modules 410 to 416 constituting the PC 100 is realized by loading the program recorded in the non-volatile memory 103 to the work memory 104 and executing the expanded program by the control circuit 101. The image processing effect presentation module 413 includes a subject analysis module 417, an effect area estimation module 418, and an effect presentation module 419.

<Cloud Development>

The cloud development process starts when the job control module 412 sends RAW image data stored in the data storage module 409 to the image processing effect presentation module 413 together with an image processing effect presentation instruction via the data management module 411. The image processing effect presentation instruction and the RAW image data are transmitted in response to a transmission instruction of the RAW image data output as the user operates the operation member 105 of the PC 100.

When the image processing effect presentation module 413 receives the RAW image data together with the image processing effect presentation instruction, the image processing effect presentation module 413 performs image processing effect presentation processing described later. After that, when the user instructs to send the image to the server 300, the job control module 412 sends the RAW image data stored in the data storage module 409 together with an instruction to perform RAW development processing described later to the server 300 via the data management module 411 using the unprocessed data transmission module 410.

When the server 300 receives the RAW image data from the PC 100 by the unprocessed data receiving module 404, it stores the RAW image data in the data storage module 405.

At that time, information on the RAW image data is also stored in the data management module 403. The job control module 402 controls to read out the RAW image data stored in the data storage module 405 via the data management module 403, perform the RAW development processing described later using the image processing module 401, and store the result in the data storage module 405 via the data management module 403.

After that, the result of the RAW development processing stored in the data storage module 405 is transmitted to the PC 100 using the processed data transmission module 406. Then, based on preset data deletion policy, the data management module 403 deletes the RAW image data and the result of the RAW development processing stored in the data storage module 405 as necessary. Deletion conditions of the data deletion policy may be set as appropriate. For example, the deletion conditions include a setting such that the RAW image data and the result of the RAW development processing will be deleted after a predetermined number of days after the result of the RAW development processing is transmitted to another terminal.

In the PC 100, the result of the RAW development processing is received by the processed data receiving module 416 and stored in the data storage module 409. At that time, the data management module 411 stores information that associates the RAW image data with the result of the RAW development processing. For example, as shown in FIG. 5, it is conceivable to store the ID of the RAW image data (RAW image ID in the figure) and the ID of the result of the RAW development processing (RAW development result ID in the figure) as a pair.

<Image Processing Effect Presentation Processing>

Figure 6:
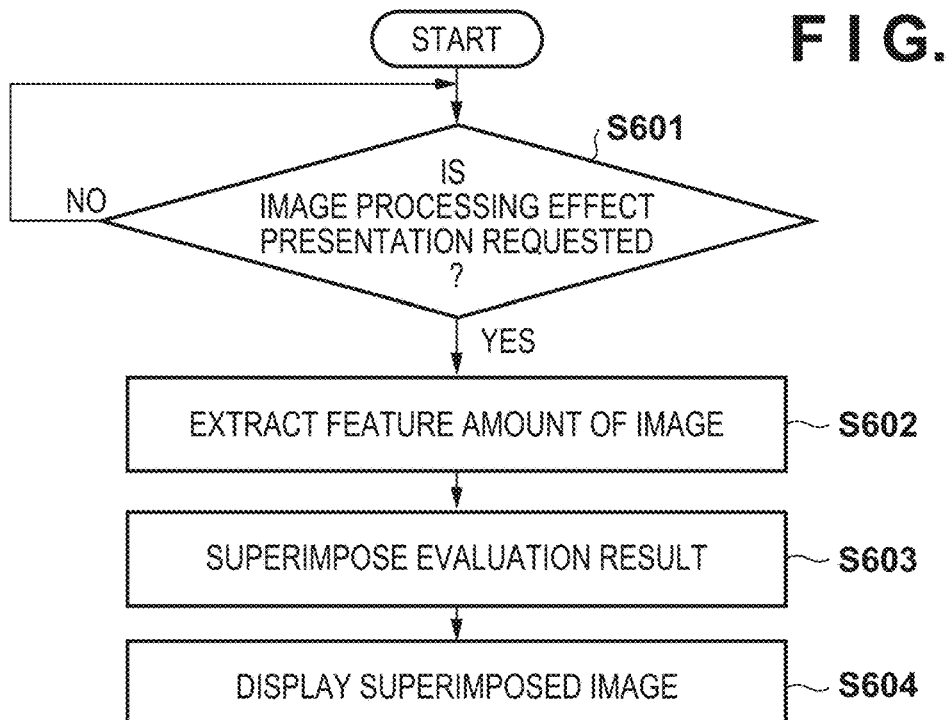
FIG. 6 is a flowchart showing an example of image processing effect presentation processing according to the embodiment.

FIG. 6 is a flowchart showing an example of image processing effect presentation processing in the present embodiment, which is executed by using the image processing effect presentation module 413. The image processing effect presentation processing is to estimate the effect of at least one of image processes executed in the course of the RAW development processing, described later, to be executed using the image processing module 401 before the RAW development processing is actually executed by the image processing module 401, and presents the estimated effect to the user.

In step S601, the image processing effect presentation module 413 waits until the RAW image data is received together with the image processing effect presentation instruction, and proceeds to step S602 upon receiving the RAW image data and the instruction.

In step S602, in the image processing effect presentation module 413, a subject analysis instruction and the RAW image data are input to the subject analysis module 417. Then, the subject analysis module 417 extracts a feature amount from the RAW image data according to the content of process performed by the image processing module 401 in order to determine whether the effect of the process performed by the image processing module 401 is high. For example, in a case where a noise reduction process is performed by the image processing module 401, since the degree of low contrast in each image area is extracted as a feature amount, the feature amount is extracted by analyzing the distribution of the results of the discrete Fourier transform processing performed on each image area.

It should be noted that data to be processed does not have to be RAW image data. For example, a preview image of RAW image data or an image obtained as a result of applying simple RAW development to RAW image data using an image processing module (not shown) in the PC 100 may be used. Further, since the feature amount to be extracted differs depending on the image processing of which the effect is to be visualized, it is necessary to change an extraction method of the feature amount according to the feature amount to be extracted.

As another method for extracting the feature amount, an extraction method in which spatial filtering processing, conversion processing to the spatial frequency domain, or the like are performed and low-contrast pixel enhancement, edge enhancement, or the like are performed may be considered. As a more specific example, in the spatial filtering processing, a filter such as a high-pass filter or a low-pass filter may be realized using the filtering processing of N×M pixels. Further, in the conversion to the spatial frequency domain, the low frequency region and the high frequency region may be enhanced or reduced through conversion using DCT, Wavelet transform, or the like.

The subject analysis module 417 outputs an effect area estimation instruction and the RAW image data to the effect area estimation module 418 together with the extracted feature amount.

In step S603, when the effect area estimation module 418 receives the effect area estimation instruction, the feature amount, and the RAW image data, the effect area estimation module 418 performs image processing so that the effect area becomes easily recognizable by the user, and generates a displayable image. For example, image processing is performed such as binarizing the feature amount with a predetermined threshold value, removing isolated points, and smoothing the outline of the effect area. After that, the effect area estimation module 418 uses the resultant image of the RAW image data which has undergone simple RAW development using an image processing module (not shown) in the PC 100 as a base image, overlays the processed image data on the base image to create a superimposed image.

Figure 10C:
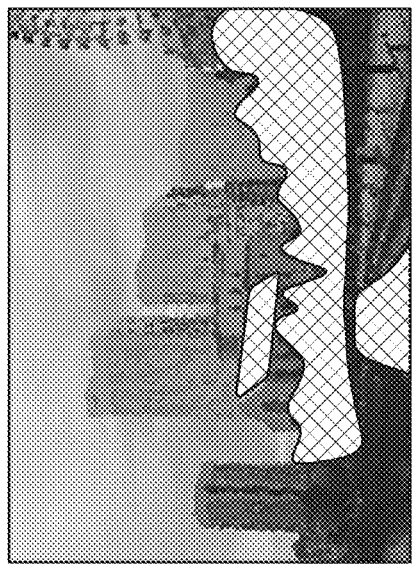
FIGS. 10A to 10D are explanatory views showing an example of a method for visualizing an effect of the image processing according to the embodiment.

In the overlay processing, for example, it is conceivable that when the pixel value of the image processed so that the effect area is easily recognized is less than a predetermined threshold value, the pixel value of the base image is used, and when it is equal to or greater than the threshold value, the pixel value of the image processed so that the effect area is easily recognized is used. For example, when the base image is as shown in FIG. 10A, it is conceivable that the contour of the effect region of the superimposed image is emphasized and the brightness of the region having a higher effect is increased as shown in FIG. 10B. Further, it is conceivable to further simplify the expression of the effect area and to emphasize the outline of the effect area and express the effect area with cross-hatching as shown in FIG. 10C. Then, the effect area estimation module 418 sends the superimposed image and the image processing effect presentation instruction to the effect presentation module 419.

In step S604, when the effect presentation module 419 receives the image processing effect presentation instruction and the superimposed image, the effect presentation module 419 displays the superimposed image on the display 106 via the job control module 412.

Although the number of image processing executed by the image processing module 401 has not been mentioned above, a plurality of image processing may be executed. In that case, the following processing is performed in steps S602 and S603.

In step S602, the subject analysis module 417 extracts the feature amounts corresponding to the contents of image processing performed by the image processing module 401 from the RAW image data for the number of types of image processing.

Next, in step S603, when the effect area estimation module 418 receives the effect area estimation instruction, the feature amounts for the number of types of image processing, and the RAW image data, image processing is performed so that the user can easily recognize the effect area, and an image is generated for each image processing. After that, the effect area estimation module 418 uses the resultant image of the RAW image data which has undergone simple RAW development using an image processing module (not shown) in the PC 100 as a base image, overlays the processed image data on the base image to create a superimposed image.

In the overlay process, for example, if the base image is the bottom layer and the image processed so that the effect area is easily recognized and to be newly superimposed is a new layer, new layers are sequentially stacked in order from the bottom layer based on a predetermined priority. For example, when a pixel value of a new layer is less than a predetermined threshold value, the pixel value of the superimposed image is taken, and when the pixel value the new layer is greater than or equal to the threshold value, the pixel value of the new layer is taken. At that time, the predetermined threshold value is independently set for each image processing executed in the image processing module 401. After that, the effect area estimation module 418 sends the superimposed image and the image processing effect presentation instruction to the effect presentation module 419.

Further, the base image used for the overlay processing does not have to be the resultant image of simple RAW development. For example, preview image data included in the RAW image data or JPEG image data taken at the same time, which is different from the RAW image data, may be used.

In addition, there may be a function for hiding the superimposed image so that the user can confirm the base image. For example, when the user presses a button for hiding the effect area, the image shown in FIGS. 10B and 10C may be replaced with the image shown in FIG. 10A. As a result, it is possible to avoid the problem that the base image becomes difficult to see because the areas where the image processing effect is high are superimposed and displayed.

<RAW Development Process>

Figure 7:
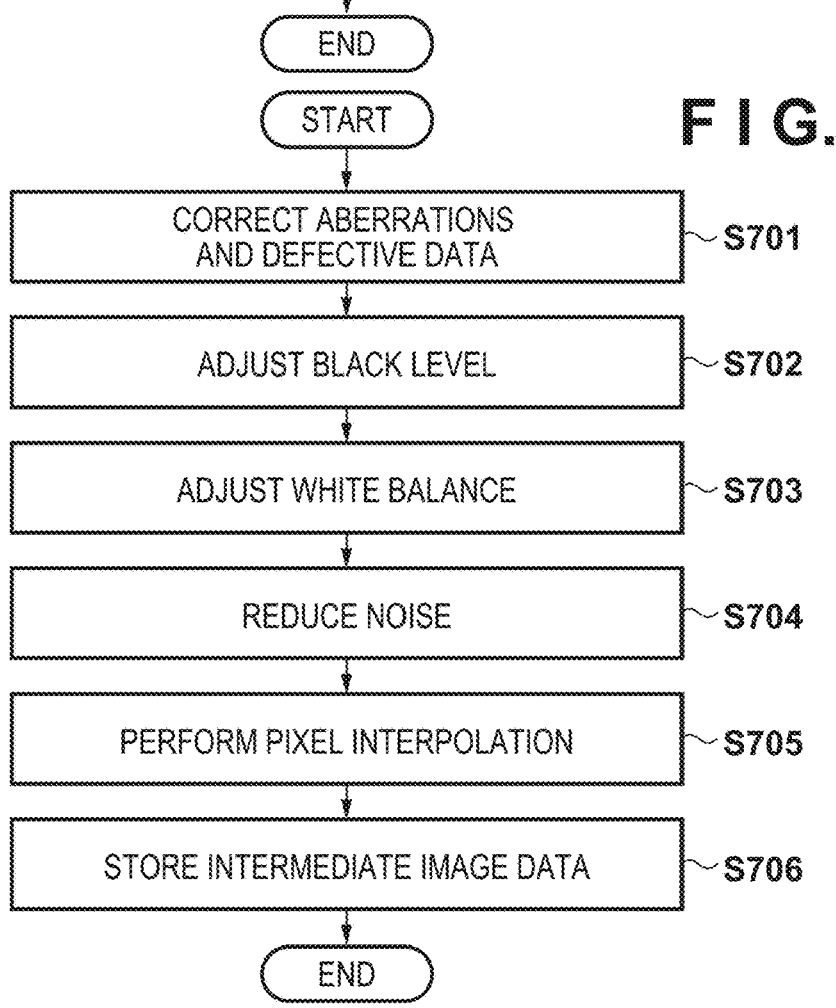
FIG. 7 is a flowchart showing an example of RAW development processing according to the embodiment.

FIG. 7 is a flowchart showing an example of the RAW development processing in the present embodiment executed by using the image processing module 401. In the present embodiment, the image processing module 401 processes the RAW image data based on the attribute information included in the RAW image data.

First, in step S701, the image processing module 401 corrects aberrations and defective data caused by a defect of an image sensor of a camera (not shown) of RAW image data. Next, the black level of the RAW image data is adjusted in step S702, and the white balance of the RAW image data is adjusted in step S703. Here, in the present embodiment, the white balance of the RAW image data is adjusted by the auto white balance function.

Next, the image processing module 401 reduces noise originated from an image sensor (not shown) in the RAW image data in step S704. Further, in step S705, pixel interpolation process is executed on the RAW image data.

Then, in step S706, the image processing module 401 stores the RAW image data processed in steps S701 to S705 as intermediate image data in the data storage module 405 via the data management module 403, and ends the process.

<Update of RAW Development Process>

Figure 8:
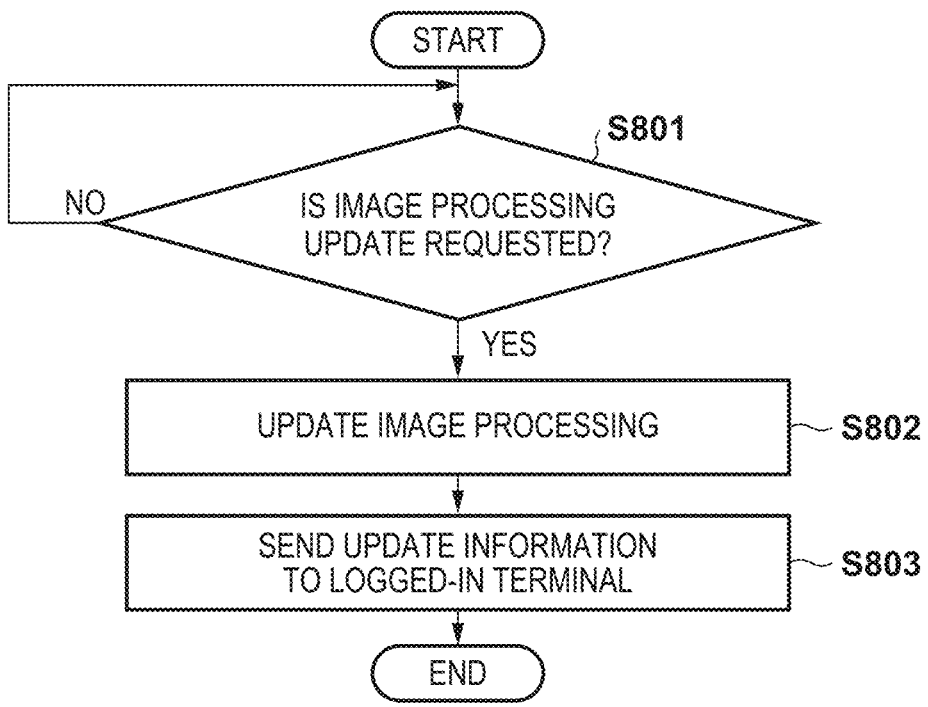
FIG. 8 is a flowchart showing an example of update processing of image processing by a server according to the embodiment.

FIG. 8 is a flowchart showing an example of update processing of the image processing in the present embodiment. This process is executed by the administrator of the server 300 operating the operation member 305 or by using the communication from the management terminal connected via the external interface 311 as a trigger.

In step S801, the image processing updating module 408 of the server 300 waits until an image processing update instruction is received. Upon receiving the image processing update instruction, the image processing updating module 408 sends the image processing update instruction to the job control module 402.

In step S802, the job control module 402 that has received the image processing update instruction updates the image processing module 401 based on the image processing update instruction after executing the image processing accompanying the RAW development processing on a job group that has been received earlier.

In step S803, the job control module 402 acquires a list of terminals logged in to the cloud development service from a login management terminal (not shown) via the external interface 311. Then, the job control module 402 transmits image processing update information to the terminals on the acquired list by using the update information transmission module 407.

Figure 9:
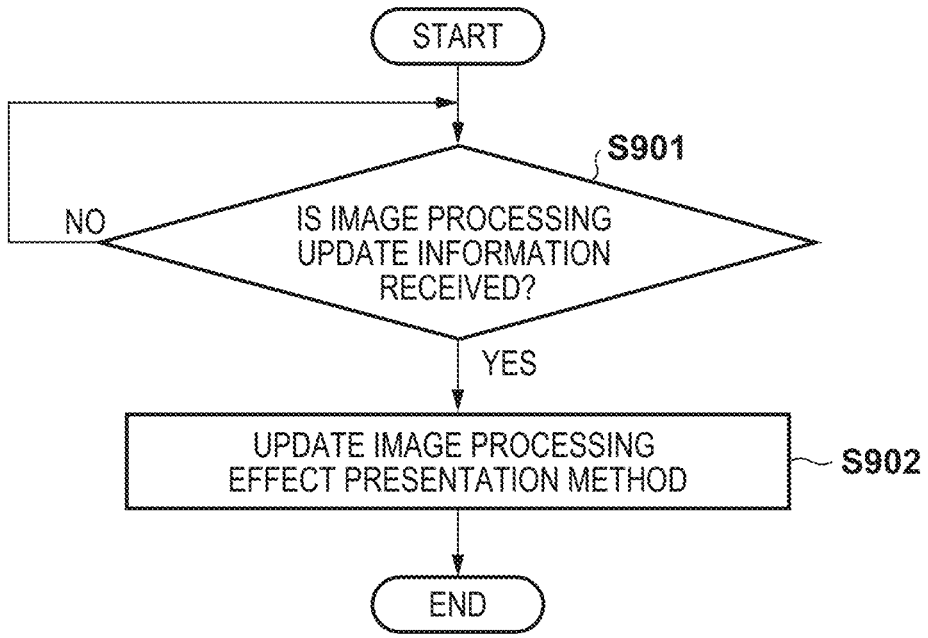
FIG. 9 is a flowchart showing an example of processes in a PC associated with the update processing of the image processing by the server according to the embodiment.

FIG. 9 is a flowchart showing an example of update processing of the image processing effect presentation method accompanying the update of the image processing module 401 in the present embodiment. This processing is executed by using an incident that the PC 100 receives the image processing update information from the server 300 as a trigger.

In step S901, the update information receiving module 415 of the PC 100 waits until the image processing update information is received via the external interface 311.

In step S902, when the update information receiving module 415 receives the image processing update information, it sends an image processing effect presentation method updating instruction and the image processing update information to the image processing effect presentation method updating module 414 via the job control module 412. The image processing effect presentation method updating module 414 updates the image processing effect presentation module 413 when it receives the image processing effect presentation method updating instruction and the image processing update information.

When updating the image processing effect presentation module 413, for example, the image processing update information may include updated software for at least one of the subject analysis module 417, the effect area estimation module 418, and the effect presentation module 419. In that case, the image processing effect presentation method is updated by replacing the existing software of each module with the updated software included in the image processing update information.

Further, the entire software (modules 410 to 419) running on the PC 100 may be updated collectively. For example, it is conceivable to receive an installer capable of collectively updating the entire software as image processing update information from the update information transmission module 407 and execute it in the image processing effect presentation method updating module 414.

In addition, a URL for downloading the installer for the batch update and the version information for identifying the installer may be received from the update information transmission module 407. It is conceivable that the image processing effect presentation method updating module 414 downloads the installer via the external interface 111 of the PC 100 using the received URL and version information, and the image processing effect presentation method updating module 414 executes the installer.

Alternatively, it is conceivable that the subject analysis module 417, the effect area estimation module 418, and the effect presentation module 419, each realizes the module itself by executing a detachable module according to the contents of image processing executed by the image processing module 401. In that case, each module is received from the update information transmission module 407 as image processing update information. After that, the image processing effect presentation method updating module 414 may replace an existing module with the received module, as needed.

In the above-described embodiment, in order to express that the effect of the image processing is high, the high effect region is superimposed on the base image as shown in FIGS. 10B and 10C, but the superimposed display does not have to be performed. For example, an image showing only the effect region of FIGS. 10B and 10C (the cross-hatched region image of FIG. 10C) and the base image of FIG. 10A may be separately displayed without overlapping each other. The advantage of not superimposing the high effect region is that the base image is not hidden, so it is easy to check the base image.

Figure 10D:
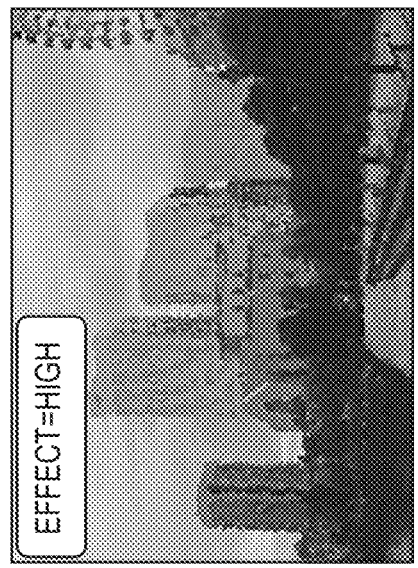
Figure 10A:
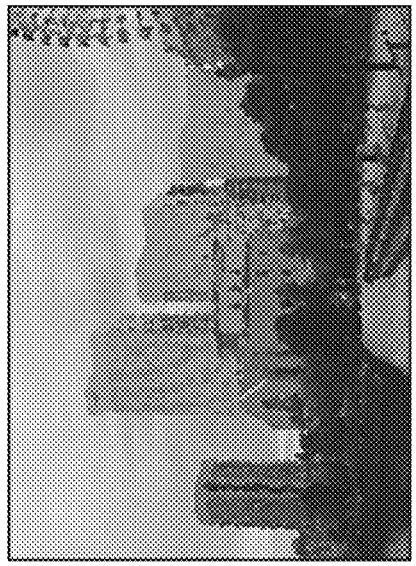
Figure 10B:
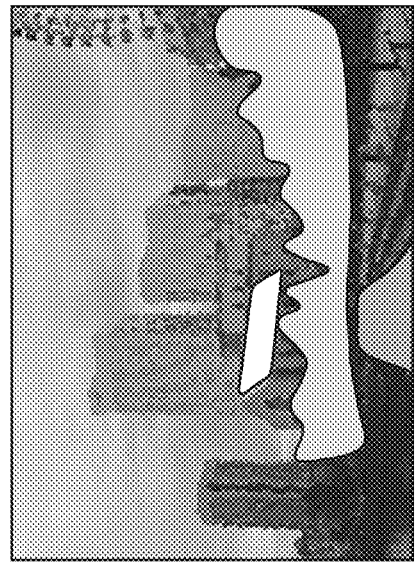

In addition, in a case where the number of pixels in the region determined to have a high image processing effect is equal to or greater than a predetermined threshold value, information indicating that the image processing effect is high may be superimposed as shown in FIG. 10D or may be displayed near the base image shown in FIG. 10A so as not to hide the base image.

As described above, according to the present embodiment, the user can grasp in advance the expected effect when the cloud image processing will be executed. Then, the user can determine whether or not to use the cloud image processing according to the expected effect.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-017235, filed on Feb. 4, 2020 which is hereby incorporated by reference herein in its entirety.

What is claimed is:

1. An information processing method comprising:
   transmitting first image data to an external image processing apparatus and receiving second image data processed by the external image processing apparatus;
   extracting a feature amount according to a content of image processing performed by the external image processing apparatus from the first image data; and
   converting the extracted feature amount to displayable information and displaying the information on a display;
   receiving, in a case where the image processing by the external image processing apparatus is changed, information on changed image processing; and
   changing the feature amount to be extracted according to the information on the changed image processing.

2. The information processing method according to claim 1, wherein the information is displayed on the display by being superimposed on the first image data.

3. The information processing method according to claim 1, wherein the first image data and the information are displayed separately on the display.

4. The information processing method according to claim 1, wherein the information is on a region where the feature amount is equal to or greater than a first threshold.

5. The information processing method according to claim 1, wherein the information indicates that the effect to be expected by the image processing is high in a case where a number of pixels included in a region where the feature amount is equal to or greater than a first threshold is equal to or greater than a second threshold.

6. The information processing method according to claim 1, wherein, in a case where there are a plurality of types of image processing that the external image processing apparatus performs, the feature amount according to the content of each type of the image processing is extracted.

7. The information processing method according to claim 1 further comprising performing predetermined second image processing on the first image data,
wherein the first image data is image data before undergone the second image processing.

8. The information processing method according to claim 1 further comprising performing predetermined second image processing on the first image data,
wherein the first image data is image data after undergone the second image processing.

9. An information processing apparatus comprising:
an external interface that transmits first image data to an external image processing apparatus and receives second image data processed by the external image processing apparatus; and
a control circuit that extracts a feature amount according to a content of image processing performed by the external image processing apparatus from the first image data, converts the extracted feature amount to displayable information, and displays the information on a display,
wherein the external interface receives, in a case where the image processing by the external image processing apparatus is changed, information on changed image processing, and
wherein the control circuit changes the feature amount to be extracted according to the information on the changed image processing.

10. A non-transitory computer-readable storage medium, the storage medium storing a program that is executable by the computer, wherein the program includes program code for performing the causing the computer to function as an information processing apparatus, comprising:
an external interface that transmits first image data to an external image processing apparatus and receives second image data processed by the external image processing apparatus; and
a control circuit that extracts a feature amount according to a content of image processing performed by the external image processing apparatus from the first image data, converts the extracted feature amount to displayable information, and displays the information on a display,
wherein the external interface receives, in a case where the image processing by the external image processing apparatus is changed, information on changed image processing, and
wherein the control circuit changes the feature amount to be extracted according to the information on the changed image processing.

* * * * *